United States Patent
Lee et al.

(10) Patent No.: US 10,938,043 B2
(45) Date of Patent: Mar. 2, 2021

(54) RESTARTING SYSTEM, CONTROLLER AND RESTARTING METHOD FOR FUEL CELL VEHICLE

(71) Applicants: Hyundai Motor Company, Seoul (KR); Kia Motors Corporation, Seoul (KR)

(72) Inventors: Kyu Il Lee, Gyeonggi-do (KR); Gun Hyung Park, Busan (KR); Sung Gone Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1163 days.

(21) Appl. No.: 15/335,338

(22) Filed: Oct. 26, 2016

(65) Prior Publication Data

US 2018/0026282 A1 Jan. 25, 2018

(30) Foreign Application Priority Data

Jul. 21, 2016 (KR) .................. 10-2016-0092412

(51) Int. Cl.
*H01M 8/04537* (2016.01)
*H01M 16/00* (2006.01)
*H01M 8/04955* (2016.01)
*H01M 8/04303* (2016.01)
(Continued)

(52) U.S. Cl.
CPC ... *H01M 8/04552* (2013.01); *H01M 8/04303* (2016.02); *H01M 8/04873* (2013.01); *H01M 8/04955* (2013.01); *H01M 8/04992* (2013.01); *H01M 16/006* (2013.01); *H01M 2250/20* (2013.01); *Y02T 90/40* (2013.01)

(58) Field of Classification Search
None
See application file for complete search history.

(56) References Cited

U.S. PATENT DOCUMENTS

| 6,612,385 B1 | 9/2003 | Stuhler et al. |
| 9,160,018 B2 | 10/2015 | Yoshida et al. |
| 2012/0013289 A1 | 1/2012 | Yoshida et al. |

(Continued)

FOREIGN PATENT DOCUMENTS

| JP | 2006-333602 A | 12/2006 |
| JP | 2007-280755 A | 10/2007 |

(Continued)

*Primary Examiner* — Daniel S Gatewood
(74) *Attorney, Agent, or Firm* — Mintz Levin Cohn Ferris Glovsky and Popeo, P.C.; Peter F. Corless

(57) ABSTRACT

A restarting system, a controller, and a restarting method for a fuel cell vehicle are provided. The restarting system includes a consumption resistor connected in parallel to a high voltage line that connects between a fuel cell and a high voltage battery and a relay that adjusts the connection between the consumption resistor and the high voltage line. A controller operates the relay and when a shutdown request signal of the vehicle is input, charges the high voltage battery with residual generated power of the fuel cell or connects the relay to the consumption resistor to consume the residual generated power as the consumption resistance. When a starting request signal of the vehicle is input, the controller is reset when an output voltage of the fuel cell is reduced to be equal to or less than a required voltage and then output a starting permission signal of the vehicle.

9 Claims, 3 Drawing Sheets

(51) Int. Cl.
*H01M 8/04858* (2016.01)
*H01M 8/04992* (2016.01)

(56) References Cited

U.S. PATENT DOCUMENTS

| | | | |
|---|---|---|---|
| 2014/0272649 | A1 | 9/2014 | Hashim et al. |
| 2015/0336471 | A1 | 11/2015 | Yoon et al. |

FOREIGN PATENT DOCUMENTS

| | | | |
|---|---|---|---|
| JP | 2008-017593 | A | 1/2008 |
| JP | 2010-238538 | A | 10/2010 |
| JP | 4893127 | B2 | 3/2012 |
| JP | 2014-041808 | A | 3/2014 |
| KR | 10-2000-0076020 | A | 12/2000 |
| KR | 10-2004-0003573 | A | 1/2004 |
| KR | 10-2008-0086941 | A | 9/2008 |
| KR | 10-2008-0095311 | A | 10/2008 |
| KR | 10-2009-0114842 | A | 11/2009 |
| KR | 10-2010-0005768 | A | 1/2010 |
| KR | 10-2011-0053855 | A | 5/2011 |
| KR | 10-2012-0012610 | A | 2/2012 |
| KR | 10-2013-0042691 | A | 4/2013 |
| KR | 10-2014-0054804 | A | 5/2014 |
| KR | 10-1449299 | B1 | 10/2014 |
| KR | 10-2015-0028146 | A | 3/2015 |
| KR | 10-1567695 | B1 | 11/2015 |

RESTARTING SYSTEM, CONTROLLER AND RESTARTING METHOD FOR FUEL CELL VEHICLE

CROSS REFERENCE TO RELATED APPLICATION

The present application claims priority to Korean Patent Application No. 10-2016-0092412, filed on Jul. 21, 2016, the entire contents of which is incorporated herein for all purposes by this reference.

BACKGROUND

1. Technical Field

The present invention relates to a restarting system, a controller, a restarting method for a fuel cell vehicle that improve a lifespan of a relay of a consumption resistor without delaying a restarting time and preventing a breakdown by a voltage adjustment of a stack main relay and a converter and an integral control of a reset sequence of a fuel cell controller to improve the lifespan of the relay and prevent the breakdown upon the restarting.

2. Description of the Related Art

As is known in the art, air remaining in a fuel cell stack should be removed from a fuel cell vehicle to prevent a deterioration of a fuel cell when starting of the vehicle is completed. For this purpose, a technology currently applied to the fuel cell vehicle uses a method of connecting a fuel cell to a consumption resistor when starting is completed to consume energy remaining in a stack, to thus remove air remaining in the stack.

When the starting of the fuel cell vehicle is complete, the time require for a shut-down sequence is long, and therefore the restarting that attempts starting immediately after a driver performs a key off operation connects the consumption resistor to the fuel cell to reset a fuel cell controller while the fuel cell consumes a voltage, thereby attempting starting again. In the restarting, a relay of a consumption resistor is attached and then detached in a fuel cell voltage (e.g., about 300 V or greater). When the relay of the consumption resistor is exposed in the high voltage state, the lifespan of the relay of the consumption resistor is short and, the relay may break down or malfunction.

The contents described as the related art have been provided merely for assisting in the understanding for the background of the present invention and should not be considered as corresponding to the related art known to those skilled in the art.

SUMMARY

An object of the present invention is to provide a restarting system, a controller, a restarting method for a fuel cell vehicle capable of improving a lifespan of a relay of a consumption resistor without delaying a restarting time and preventing a breakdown by a voltage control of a stack main relay and a converter and an integral control of a reset sequence of a fuel cell controller to improve the lifespan of the relay and prevent the breakdown upon the restarting.

According to an exemplary embodiment of the present invention, a restarting system for a fuel cell vehicle may include: a consumption resistor connected in parallel to a high voltage line that connects between a fuel cell and a high voltage battery; a relay configured to adjust the connection between the consumption resistor and the high voltage line; and a controller configured to operate the relay, when a shutdown request signal of the vehicle is input, charge the high voltage battery with residual generated power of the fuel cell or connect the relay to the consumption resistor to consume the residual generated power as the consumption resistor, and when a starting request signal of the vehicle is input, may be reset when an output voltage of the fuel cell is reduced to be equal to or less than a required voltage and then output a starting permission signal of the vehicle.

The consumption resistor may be connected between the fuel cell and the high voltage battery in parallel. The relay may be configured of a large-capacity switch and a low-capacity switch. The large-capacity switch may be a normal open switch and the low-capacity switch may be a normal close switch. The controller may be configured to maintain both of the large-capacity switch and the low-capacity switch in an open state in a starting state of the vehicle and operate the large-capacity switch to be in a closed state and the low-capacity switch to be in an open state when an ending signal is input. The low-capacity switch may be closed during the reset of the controller in the open state and then may be opened again.

When an amount of air in the fuel cell is reduced to be equal to or less than a required air amount when a starting request signal of the vehicle is input, the controller may be reset and then may be configured to output the starting permission signal of the vehicle. When an energy amount in the fuel cell is reduced to be equal to or less than a required energy amount when the starting request signal of the vehicle is input, the controller may be reset and then may be configured to output the starting permission signal of the vehicle. The high voltage battery may be connected to the high voltage line via a converter, the controller may be configured to operate the converter in a buck mode when the shutdown request signal of the vehicle is input to charge the high voltage battery with the residual generated power of the fuel cell to perform a decrease control on the output voltage of the fuel cell.

According to another exemplary embodiment of the present invention, a restarting method performed by a controller of the restarting system for a fuel cell vehicle as described above may include: when a shutdown request signal of the vehicle is input, charging, by the controller, a high voltage battery with residual generated power of the fuel cell or connecting a relay to a consumption resistor to consume the residual generated power as the consumption resistor; recognizing, by the controller, a starting request signal of the fuel cell vehicle; and when an output voltage of the fuel cell is reduced to be equal to or less than a required voltage, resetting the controller and outputting, by the controller, a starting permission signal of the fuel cell vehicle.

According to still another exemplary embodiment of the present invention, a restarting method performed by a controller of the restarting system for a fuel cell vehicle as described above may include: when a shutdown request signal of the fuel cell vehicle is input, performing a decrease control on an output voltage of a fuel cell by operating, by a controller, a converter in a buck mode to charge a high voltage battery with residual generated power of the fuel cell; recognizing, by the controller, a starting request signal of the fuel cell vehicle; when the output voltage of the fuel cell is greater than a required voltage or a shutdown request signal is input and then a starting request signal is input within a predetermined time, connecting, by the controller, a relay to a consumption resistor to consume the residual generated power of the fuel cell as the consumption resistance; and when the output voltage of the fuel cell is reduced to be equal to or less than the required voltage, resetting the controller and outputting, by the controller, the starting permission signal of the fuel cell vehicle.

According to still yet another exemplary embodiment of the present invention, there is provided a controller for a restarting system of a fuel cell vehicle in which a relay and a consumption resistor are parallel-connected to a high voltage line connecting between a fuel cell and a high voltage battery, wherein the controller may control an operation of the relay, when a shutdown request signal of the vehicle is input, charge the high voltage battery with residual generated power of the fuel cell or connects the relay to the consumption resistor to consume the residual generated power as the consumption resistance, and when a starting request signal of the vehicle is input, is reset if an output voltage of the fuel cell is reduced to be equal to or less than a required voltage and then output a starting permission signal of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
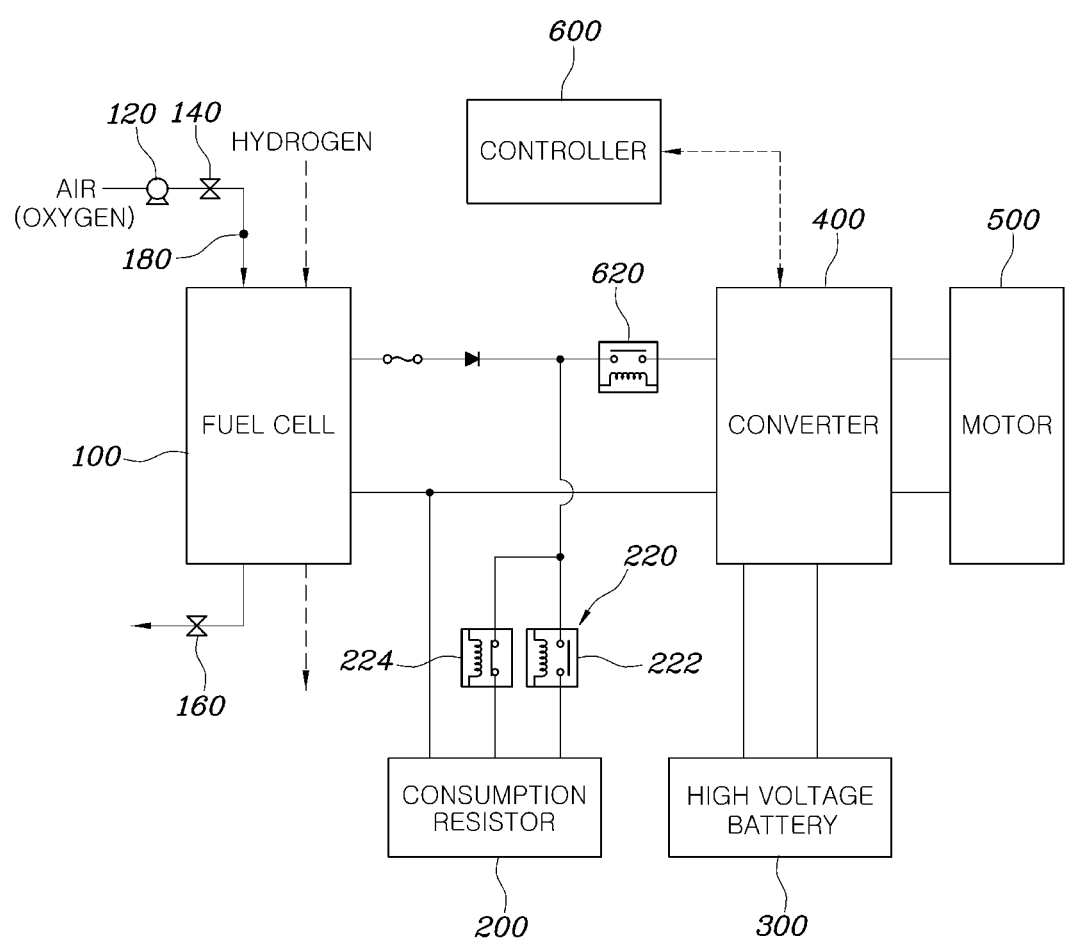
FIG. 1 is a diagram illustrating a restarting system for a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
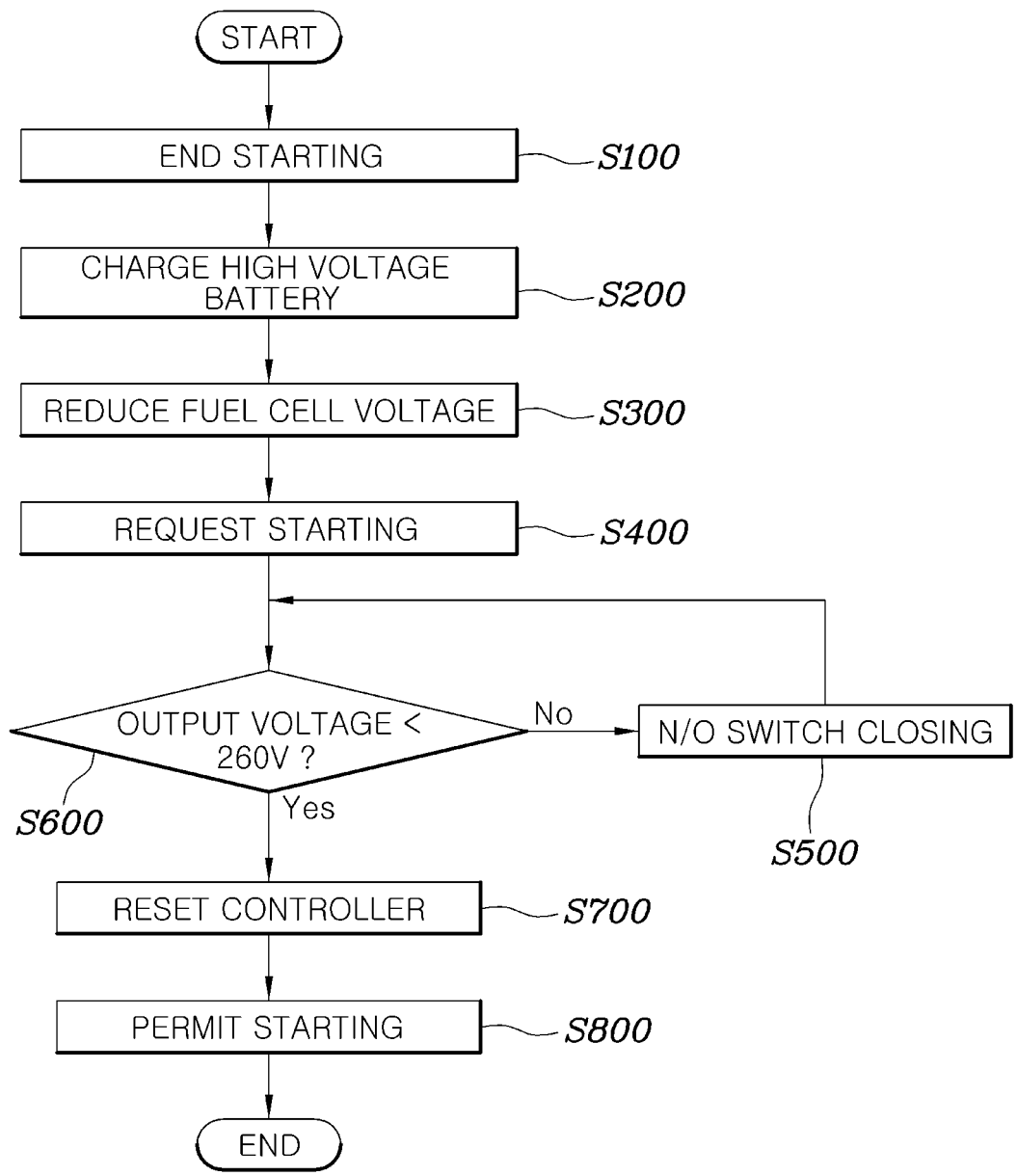
FIG. 2 is a flow chart of a restarting method for a fuel cell vehicle according to an exemplary embodiment of the present invention.
Figure 3:
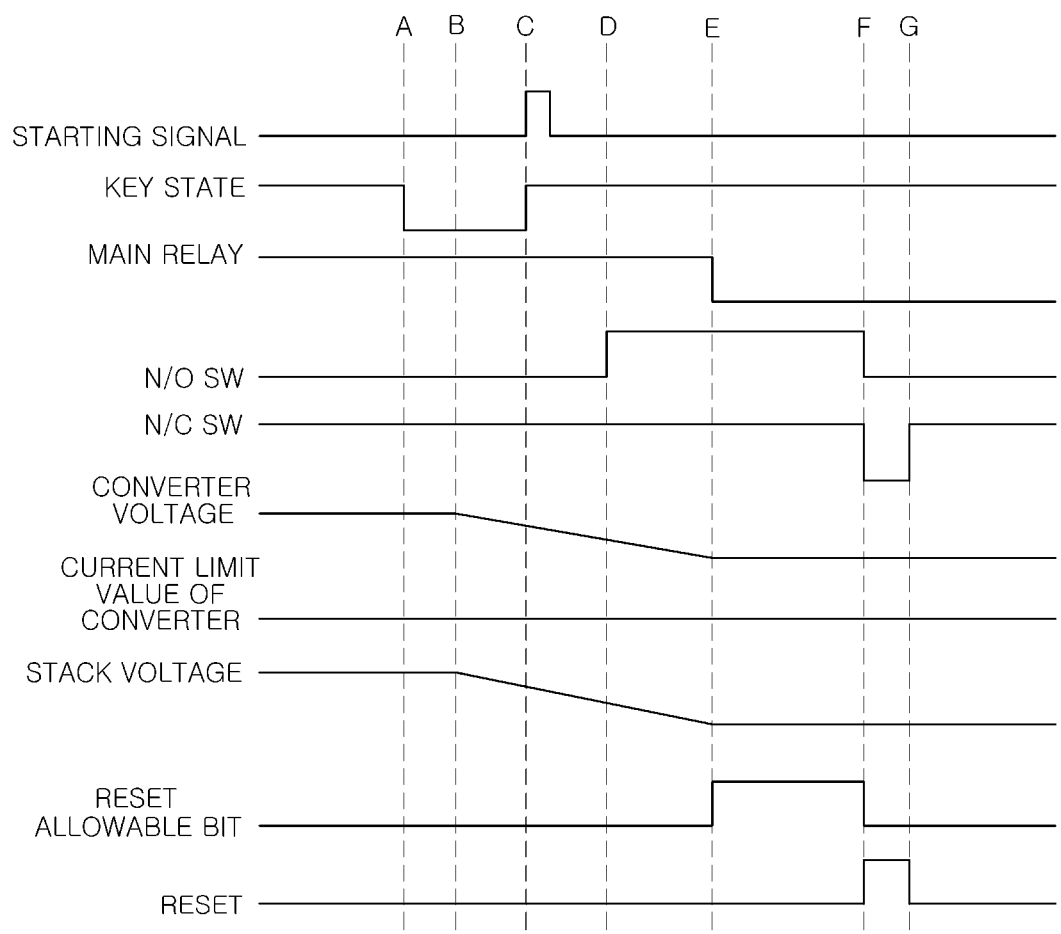
FIG. 3 is a diagram illustrating a process of a restarting method for a fuel cell vehicle according to an exemplary embodiment of the present invention.

FIG. 1 is a diagram illustrating a restarting system for a fuel cell vehicle according to an exemplary embodiment of the present invention, FIG. 2 is a flow chart of a restarting method for a fuel cell vehicle according to an exemplary embodiment of the present invention, and FIG. 3 is a diagram illustrating a process of a restarting method for a fuel cell vehicle according to an exemplary embodiment of the present invention.

The restarting system for a fuel cell vehicle according to the exemplary embodiment of the present invention may include: a consumption resistor 200 connected in parallel to a high voltage line that connects between a fuel cell 100 and a high voltage battery 300; a relay 220 configured to adjust the connection between the consumption resistor 200 and the high voltage line; and a controller 600 configured to operate the relay 220, when a shutdown request signal of the vehicle is input, charge the high voltage battery 300 with residual generated power of the fuel cell 100 or connect the relay 220 to the consumption resistor 200 to consume the residual generated power as the consumption resistance, and when a starting request signal of the vehicle is input, the controller may be reset when an output voltage of the fuel cell 100 is reduced to be equal to or less than a required voltage and then the controller may be configured to output a starting permission signal of the vehicle.

As illustrated in FIG. 1, in the fuel cell vehicle, air or oxygen and hydrogen are supplied to the fuel cell 100, and water is generated and a current is generated. An inlet and an outlet of air line may each include valves 140 and 160. Further, the air line may include a blower 120 configured to circulate air into the fuel cell to adjust an output of the fuel cell based on a supplied amount of air. Power generated from the fuel cell 100 may be charged in the high voltage battery through a high voltage line or may be supplied to a driving motor 500 to drive the vehicle. The high voltage line may include a converter 400 configured to drive the driving motor 500 based on boost (e.g., boost mode) or charge the high voltage battery 300 based on buck (buck mode).

Further, the converter 400 may be operated by a separate fuel cell controller 600 that may be integrally embedded in the converter 400.

In the fuel cell 100, to prevent a deterioration of the fuel cell 100 when the starting of the vehicle is complete, air remaining in the stack needs to be removed. A technology that is applied to the current fuel cell vehicles uses a method of connecting the fuel cell 100 to the consumption resistor 200 connected to the high voltage line in parallel when starting is completed to consume energy remaining in the stack, thereby removing the air remaining in the stack. As a result, when the starting of the fuel cell vehicle is complete, time taken for a shut-down sequence is long, and therefore the restarting that attempts starting as soon as 1 to 2 seconds lapses after a driver performs a key off operation connects the consumption resistor 200 to the fuel cell to reset the fuel cell controller 600 while the fuel cell consumes a voltage, thereby attempting starting again However, in the restarting, the relay 220 of the consumption resistor 200 is attached and then detached when the voltage of the fuel cell 100 is a high voltage (e.g., about 300 V or greater). Accordingly, when the on/off of the relay is repeatedly performed in the high voltage state, the lifespan of the relay 220 of the consumption resistor 200 is decreased and the relay 220 may fail or malfunction.

The present invention is provided to improve the lifespan of the relay 220 of the consumption resistor without delaying the restarting time and prevent the breakdown by a voltage control of a stack main relay 620 and the converter 400 and an integral control of a reset sequence of the fuel cell controller 600 to improve the lifespan of the relay 220 of the consumption resistor and prevent the breakdown upon the restarting. First, the consumption resistor 200 may be connected in parallel between the fuel cell 100 and the high voltage battery 300. The consumption resistor 200 may also be a pure resistance form and may include an accessory that consumes various types of power. Further, the relay 220 that connects between the consumption resistor 200 and the high voltage line may be configured of a large-capacity switch 222 and a low-capacity switch 224.

Meanwhile, the large-capacity switch 222 may be an open switch and may typically be maintained in an open state, in particular, may be a closed type when operated by the controller 600 and the low-capacity switch 224 may be a close switch and may typically be maintained in a closed state, in particular, may be opened type when operated by the controller 600. Therefore, when the controller 600 is reset, the low-capacity switch 224 may rapidly switch to the closed state when operated to be opened. When the reset of the controller 600 is completed, the low-capacity switch 224 may be operated to be opened again, but may not avoid the instant opening/closing operation upon the reset.

The controller 600 may be configured to maintain both of the large-capacity switch 222 and the low-capacity switch 224 in an open state in the starting state of the vehicle, to prevent unnecessary waste of power through the consumption resistor 200. When the shutdown request signal is input, the controller may be configured to operate the large-capacity switch 222 to be in the closed state to allow the consumption resistance to consume surplus power of the fuel cell 100 remaining after the starting is complete to prevent the deterioration of the fuel cell 100 and secure the durability of the fuel cell 100. Further, the low-capacity switch 224 may be first operated to be in the open state. The low-capacity switch 224 may typically be closed after all the power consumption ends and the controller may be turned off, and therefore may be connected when the vehicle is parked to be useful to completely remove the residual power of the fuel cell for a substantial period of time.

Furthermore, the controller 600 may be configured to operate the relay 220 and charge the high voltage battery 300 with the residual generated power of the fuel cell 100 when the shutdown request signal of the vehicle is input or connect the relay 220 to the fuel cell 100 to consume the residual generated power as the consumption resistance 200. When an output voltage of the fuel cell 100 is decreased to be equal to or less than the required voltage when a starting request signal of the vehicle is input when the controller 600 performs the starting end sequence, the controller 600 may be reset and then may be configured to output a starting permission signal of the vehicle and normally restart the vehicle.

Considering characteristics of the type of the low-capacity switch 224 of the relay 220, the control may not be executed when the controller 600 is reset when the low-capacity switch 224 is in the open state, and therefore the low-capacity switch 224 may be again opened when the controller restarts after the low-capacity switch 224 is closed and after the reset ends. In other words, the closing/open may be repeated when the controller 600 is reset. Further, when the state is repeated in the high voltage state, the switch may be rapidly damaged. Accordingly, even though the restarting is required, the reset of the controller 600 may be performed when the output voltage of the fuel cell 100 is low, thereby securing the durability of the switch.

In other words, according to the present invention, to rapidly remove the voltage of the fuel cell 100 when the starting is complete, the charging may be performed by the high voltage battery 300, power may be consumed by the connection to the large-capacity switch 222 when the restarting is requested during the process, the controller 600 may be reset and the restarting may be performed when the voltage is reduced to be equal or less than a predetermined level, to prevent the switch from being damaged even when the low-capacity switch 224 is closed/opened.

Meanwhile, the controller 600 may be reset when an internal air amount is reduced to be equal to or less than a required air amount and then the starting permission signal of the vehicle may be output. Originally, the voltage should be reduced to protect the switch, however, the output voltage of the fuel cell and the air amount in the fuel cell have a close proportional relation with each other, and therefore it may be possible to detect the level of voltage output from the fuel cell based on the air amount in the fuel cell. As illustrated in FIG. 1, the inlet and the outlet of the air line of the fuel cell 100 may each include the valves 140 and 160. Therefore, when both of the input valve 140 and the output valve 160 are closed when the starting is complete, the air amount in the fuel cell may be detected, which may be measured by the air sensor 180. Therefore, when the remaining amount of air is measured by the air sensor 180, the magnitude of voltage output from the fuel cell 100 may be approximately detected and therefore it may be possible to determine the reset time based on the detected magnitude of voltage.

Similarly, the output voltage of the fuel cell 100 may be set to be about 260 V with respect to the voltage of the whole stack, but the reset time may be determined with respect to about 0.6 V that is the output voltage of the unit cell, the energy in the fuel cell may be calculated based on the air amount in the fuel cell, and the reset time may be determined based on the calculated energy. In other words, on the basis of the output voltage of the fuel cell 100, the controller may be reset at time when the output voltage of the fuel cell 100 is reduced to about 260 V, on the basis of the output voltage of the unit cell, the controller may be reset at about 0.6 V in average, and on the basis of the air amount or the overall energy, the controller may be operated at the reset time when the output voltage is reduced to be less than about 5%.

Meanwhile, the high voltage battery 300 may be connected to the high voltage line via the converter 400, the controller 600 may first be configured to operate the converter 400 in the buck mode when the shutdown request signal of the vehicle is input to charge the high voltage battery 300 with the residual generated power of the fuel cell 100, to perform the decrease control on the output voltage of the fuel cell 100. In particular, a current limit value of the converter 100 in the buck mode may be adjusted to be a value of the charging power of the high voltage battery but a current maximum value in the buck mode may be limited to be about 150 A and a current minimum value may be limited to be about 20 A. Further, when the voltage of the fuel cell 100 is sufficiently low and thus the controller 600 may be reset, first of all, the controller 600 may be reset when a main relay 620 is turned off to protect the system. Particularly, the reset control that may be performed based on the cell voltage, the air amount, the energy, or the like has been described hereinabove.

FIG. 2 is a flow chart of a restarting method for a fuel cell vehicle according to an exemplary embodiment of the present invention. A restarting method performed by a controller of a restarting system for a fuel cell vehicle may include: when a shutdown request signal of the fuel cell vehicle is input (S100), charging, by the controller, a high voltage battery with residual generated power of the fuel cell or connecting a relay to a consumption resistor to consume the residual generated power as the consumption resistance (S200); recognizing, by the controller, a starting request signal of the fuel cell vehicle (S400); and when an output voltage of the fuel cell is reduced to be equal to or less than a required voltage, resetting the controller (S700) and outputting, by the controller, a starting permission signal of the fuel cell vehicle (S800).

A restarting method performed by a controller of a restarting system for a fuel cell vehicle according to another exemplary embodiment of the present invention may include: when a shutdown request signal of the fuel cell vehicle is input (S100), perform a decrease adjustment on an output voltage of a fuel cell by operating, by a controller, a converter in a buck mode to charge a high voltage battery with residual generated power of the fuel cell (S200 and S300); recognizing, by the controller, a starting request signal of the fuel cell vehicle (S400); when the output voltage of the fuel cell is greater than a required voltage or a shutdown request signal is input and then a starting request signal is input within a predetermined time (S400), connecting, by the controller, a relay to a consumption resistor to consume the residual generated power of the fuel cell as the consumption resistance (S500); and when the output voltage of the fuel cell is reduced to be equal to or less than the required voltage, resetting the controller (S700) and outputting, by the controller, the starting permission signal of the fuel cell vehicle (S800).

In other words, when the controller receives the shutdown request signal, the controller may be configured to charge the high voltage battery to consume the residual generated power of the fuel cell and decrease the output voltage. When the starting request signal is input when the starting end is not complete, the output voltage of the fuel cell may be detected using a voltage sensor embedded in the converter. The controller may be reset when the output voltage of the fuel cell is reduced to, for example, about 260 V and the restarting may be executed rapidly without damaging to the relay even though the restarting is performed. However, the normal open type large-capacity switch may be additionally closed when the output voltage of the fuel cell exceeds about 260V to additionally reduce the voltage of the fuel cell to the consumption power, thereby rapidly reducing the voltage of the fuel cell and moving the reset time of the controller and the restarting time forward. By the process, the deterioration of the fuel cell may be prevented, the restarting time may be pushed forward maximally, in particular, the damage of the relay may be prevented and the relay may be protected.

FIG. 3 is a diagram illustrating a process of a restarting method for a fuel cell vehicle according to an exemplary embodiment of the present invention, in which A represents the shutdown request signal, B represents the high voltage battery charging start, C represents the starting request signal, D represents the large-capacity switch closing, E represents the controller reset permission, F represents the controller reset state, and G represents each time of the starting permission signals.

As shown in FIG. 3, when the starting of the vehicle is complete, the output voltage of the fuel cell decreases by the high voltage battery. Further, when the starting request is input, when the voltage of the fuel cell does not sufficiently decrease, the large-capacity switch (N/O SW) may be closed to additionally reduce the voltage. In particular, the low-capacity switch (N/C SW) may be maintained in the open state. When the output voltage of the fuel cell sufficiently decreases, the reset permission signal may be output and the controller may be configured to execute the reset. In particular, the low-capacity switch may be configured to perform the closing/open by the reset of the controller. The output voltage of the fuel cell may be reduced thus preventing any issues with durability. Further, the controller may be configured to perform the restarting of the fuel cell after being reset within error.

According to the restarting system, the controller, the restarting method for a fuel cell vehicle in accordance with the exemplary embodiment of the present invention, it may be possible to improve the lifespan of the relay of the consumption resistor without delaying the restarting time and prevent the breakdown by the voltage control of the stack main relay and the converter and the integral control of the reset sequence of the fuel cell controller to improve the lifespan of the relay and prevent the breakdown upon the restarting. As a result, the fuel cell voltage maintains the low voltage when the fuel cell controller is reset, and therefore the durability life of the relay of the consumption resistor may be increased over 10 times.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:
1. A restarting system for a fuel cell vehicle, comprising:
  a consumption resistor connected in parallel to a high voltage line that connects between a fuel cell and a high voltage battery;
  a relay configured to adjust the connection between the consumption resistor and the high voltage line; and
  a controller configured to operate the relay, when a shutdown request signal of the vehicle is input, charge the high voltage battery with residual generated power of the fuel cell or connect the relay to the consumption resistor to consume the residual generated power, and when a starting request signal of the vehicle is input, perform a reset when an output voltage of the fuel cell is reduced to be equal to or less than a required voltage and output a starting permission signal of the vehicle.

2. The restarting system of claim 1, wherein the consumption resistor is connected in parallel between the fuel cell and the high voltage battery.

3. The restarting system of claim 1, wherein the relay is configured of a large-capacity switch and a low-capacity switch.

4. The restarting system of claim 3, wherein the large-capacity switch is an open switch and the low-capacity switch is a close switch.

5. The restarting system of claim 4, wherein the controller is configured to maintain both of the large-capacity switch and the low-capacity switch in an open state in a starting state of the vehicle and operate the large-capacity switch to be in a closed state and the low-capacity switch to be in an open state when an ending signal is input.

6. The restarting system of claim 5, wherein the low-capacity switch is closed during the reset of the controller in the open state and then is opened again.

7. The restarting system of claim 1, wherein when an air amount in the fuel cell is reduced to be equal to or less than a required air amount when the starting request signal of the vehicle is input, the controller is reset and then configured to output the starting permission signal of the vehicle.

8. The restarting system of claim 1, wherein when an energy amount in the fuel cell is reduced to be equal to or less than a required energy amount when the starting request signal of the vehicle is input, the controller is reset and then configured to output the starting permission signal of the vehicle.

9. The restarting system of claim 1, wherein the high voltage battery is connected to the high voltage line via a converter, the controller is configured to operate the converter in a buck mode when the shutdown request signal of the vehicle is input to charge the high voltage battery with the residual generated power of the fuel cell to decrease the output voltage of the fuel cell.

\* \* \* \* \*